(12) United States Patent
Yamada et al.

(10) Patent No.: US 7,513,128 B2
(45) Date of Patent: Apr. 7, 2009

(54) EJECTOR-TYPE CYCLE

(75) Inventors: Etsuhisa Yamada, Kariya (JP);
Hirotsugu Takeuchi, Nagoya (JP);
Haruyuki Nishijima, Obu (JP)

(73) Assignee: Denso Corporation, Kariya (JP)

( * ) Notice: Subject to any disclaimer, the term of this patent is extended or adjusted under 35 U.S.C. 154(b) by 203 days.

(21) Appl. No.: 11/500,260

(22) Filed: Aug. 7, 2006

(65) Prior Publication Data

US 2007/0028630 A1    Feb. 8, 2007

(30) Foreign Application Priority Data

Aug. 8, 2005    (JP)    ............... 2005-229314

(51) Int. Cl.
*F25B 1/06*    (2006.01)
(52) U.S. Cl. .......................... 62/500; 62/512
(58) Field of Classification Search ............ 62/500, 62/512, 525, 527, 528, 170, 191; 165/908; 417/151, 168, 187, 198; 137/83, 282, 324
See application file for complete search history.

(56) References Cited

U.S. PATENT DOCUMENTS

| | | | | |
|---|---|---|---|---|
| 3,701,264 | A * | 10/1972 | Newton | .................. 62/191 |
| 6,729,149 | B2 * | 5/2004 | Takeuchi | .................. 62/191 |
| 6,925,835 | B2 * | 8/2005 | Nishijima et al. | .................. 62/500 |
| 7,207,186 | B2 * | 4/2007 | Hirota | .................. 62/228.3 |
| 7,299,645 | B2 * | 11/2007 | Oshitani et al. | .................. 62/191 |
| 2004/0065112 | A1 * | 4/2004 | Sakai et al. | .................. 62/500 |
| 2004/0069012 | A1 * | 4/2004 | Inoue | .................. 62/500 |
| 2005/0011221 | A1 * | 1/2005 | Hirota | .................. 62/500 |
| 2005/0155374 | A1 * | 7/2005 | Oshitani et al. | .................. 62/500 |
| 2005/0178150 | A1 | 8/2005 | Oshitani et al. | |
| 2005/0268644 | A1 | 12/2005 | Shieh et al. | |

FOREIGN PATENT DOCUMENTS

| | | | |
|---|---|---|---|
| JP | 05-312421 | | 11/1993 |
| JP | 2001-221517 A | * | 8/2001 |
| JP | 2004-257694 | | 9/2004 |
| JP | 2005-308380 | | 11/2005 |

* cited by examiner

*Primary Examiner*—Mohammad M Ali
(74) *Attorney, Agent, or Firm*—Harness, Dickey & Pierce, PLC

(57) ABSTRACT

An ejector-type cycle, for exchanging heat using a refrigerant, comprises: a compressor for compressing the refrigerant; a condenser for condensing the compressed refrigerant, a first orifice arranged downstream of the condenser; an ejector arranged downstream of the first orifice and capable of exhibiting a sucking force at the inlet thereof; a first evaporator for exchanging heat with an external fluid by passing the refrigerant and having a refrigerant outlet connected to the inlet of the ejector; a dryness degree adjusting mechanism interposed between the first orifice and the ejector and connected to the ejector and the first evaporator so as to supply the refrigerant thereto, and a second orifice arranged downstream of and connected to the dryness degree adjusting mechanism.

6 Claims, 6 Drawing Sheets

PRIOR ART

EJECTOR-TYPE CYCLE

BACKGROUND OF THE INVENTION

1. Field of the Invention

This invention relates to an ejector-type cycle having an ejector or, in particular, to an ejector-type cycle in which the refrigerant branches at a point upstream of the ejector and which is effectively applicable to the refrigeration cycle of a vehicle climate control system (air conditioner).

2. Description of the Related Art

The vehicle climate control system (air conditioner) generally uses a refrigeration cycle in which the refrigerant is compressed by a compressor and, after being passed through a condenser, passes through an expansion valve and an evaporator and the air-conditioning air is cooled in the evaporator utilizing the evaporation of the refrigerant. As such a refrigeration cycle, an ejector-type cycle having an ejector arranged before the evaporator is known. The ejector-type cycle is used, for example, in the case where the cooling operation is required to have two temperature bands for air-conditioning and refrigeration (or cold storage), in which case a refrigerant lower in dryness degree is supplied to one of the evaporators for cooling, by taking advantage of the sucking force of the ejector, thereby to achieve a cooling operation at a still lower temperature.

A conventional cycle configuration for the vapor compression refrigerator using the ejector, i.e. the conventional ejector-type cycle, is explained below with reference to FIG. 6. The refrigeration cycle 100 of the conventional ejector-type cycle is used to cool the air-conditioning air in the climate control system for automotive vehicles. The refrigeration cycle 100 includes a compressor 1 for compressing the refrigerant, a condenser 2 for cooling the compressed refrigerant, an ejector 6 for ejecting the refrigerant therethrough at high speed and is capable of sucking in the refrigerant through an inlet 64 by the suction action of the injection, a second evaporator 8 connected to an outlet 63 of the ejector 6 to cool the air-conditioning air by evaporation of the refrigerant, a gas-liquid separator 4 connected to the refrigerant outlet of the second evaporator 8, and a first evaporator 7 connected to and located between the gas-liquid separator 4 and the inlet 64 of the ejector 6. In the first evaporator 7, the refrigerant is sucked in by the ejector 6. The liquid refrigerant, therefore, is decompressed through an orifice mechanism 5 and is supplied in two phases, gas and liquid, from the gas-liquid separator 5 to the first evaporator 7. This refrigerant, having a low degree of dryness and a high cooling efficiency, is used for low-temperature cooling operation such as refrigeration. A system or an apparatus utilizing the ejector-type cycle in this way include two evaporators usable in different temperature zones and is adapted to serve two applications such as, for example, air-conditioning and refrigeration (cold storage).

Figure 6:
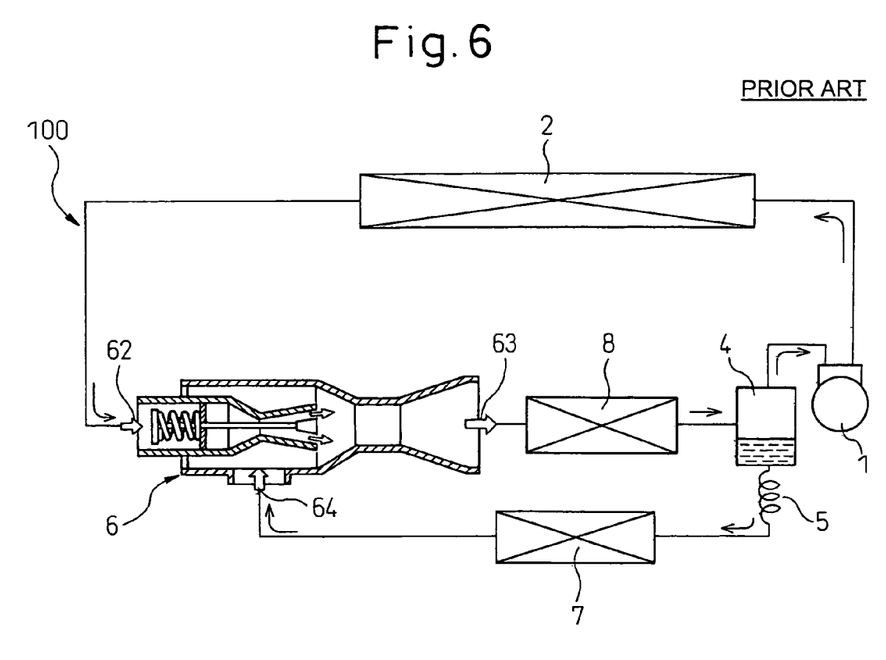
FIG. 6 is a diagram for illustrating the conventional ejector-type cycle.

The conventional configuration of the ejector-type cycle shown in FIG. 6, i.e. the configuration having a gas-liquid separator in the intake portion of the compressor is known (Japanese Unexamined Patent Publication No. 5-312421). This conventional technique, however, is considered somewhat inefficient in view of the fact that the first evaporator 7 uses the high-temperature, low-pressure refrigerant heated through the second evaporator 8. In this ejector-type cycle, it is considered more efficient for the first evaporator to use the refrigerant upstream of the ejector, i.e. at the outlet of the condenser. Such a high efficiency ejector-type cycle is in demand.

In another conventional technique (Japanese Unexamined Patent Publication No. 2004-257694, for example), an ejector-type cycle is provided in which a high-pressure gas refrigerant not condensed by the condenser is introduced into the ejector as a power source. This conventional technique, however, is different from the disclosure of this invention.

SUMMARY OF THE INVENTION

This invention has been developed in view of the situation described above, and the object thereof is to provide an ejector-type cycle in which the refrigerant is branched upstream of the ejector and the refrigeration ability can be improved by utilizing the evaporator efficiently.

Another object of this invention is to reduce the cost of the ejector-type cycle.

In order to achieve the aforementioned objects, according to a first aspect of the present invention, there is provided an ejector-type cycle (50, 60), for exchanging heat using a refrigerant, comprising: a compressor (1) for compressing the refrigerant; a condenser (2) for condensing the compressed refrigerant; a first orifice (3) arranged downstream of the condenser (2); an ejector (6) arranged downstream of the first orifice (3) and capable of exhibiting a sucking force (ability) at the inlet (64) thereof; a first evaporator (7) for exchanging heat with an external fluid by passing the refrigerant through the first evaporator and having a refrigerant outlet connected to the inlet (64) of the ejector (6); a dryness degree adjusting mechanism (4) interposed between the first orifice (3) and the ejector (6) and connected to the ejector (6) and the first evaporator (7) so as to supply the refrigerant thereto, and a second orifice (5) arranged downstream of and connected to the dryness degree adjusting mechanism (4).

With this configuration having the dryness degree adjusting mechanism upstream of the ejector, the dryness degree of the refrigerant at the inlet of the first evaporator and the inlet of the ejector nozzle can be adjusted. As a result, the refrigerant at the inlet of the first evaporator can be maintained at a low dryness degree and the first evaporator can be efficiently used for an improved refrigeration ability. Further, in view of the fact that the refrigerant at the inlet of the ejector nozzle can be maintained at a high dryness degree (a large specific volume of the refrigerant can be maintained), the diameter of the ejector nozzle can be increased and the fabrication of the ejector nozzle is facilitated. Thus, the cost of the ejector unit and hence the cost of the ejector-type cycle can be reduced.

According to a second aspect of the invention, there is provided an ejector-type cycle in the first aspect, further comprising a second evaporator (8). The second evaporator (8) is connected to and supplied with the refrigerant from the ejector (6) and, therefore can exchange heat with an external fluid such as the air-conditioning air.

In this aspect, the provision of two evaporators meets the requirements of heat exchange in different temperature ranges for cooling and refrigeration (cold storage), for example.

According to a third aspect of the invention, there is provided an ejector-type cycle in the first or second aspect, wherein the dryness degree adjusting mechanism (4) separates the gas-liquid two-phase refrigerant decompressed by the first orifice (3) into a gas and a liquid and adjusts the dryness degree of the refrigerant, after which the liquid refrigerant is introduced to the second orifice (5) and then the refrigerant of a predetermined high dryness degree is introduced to the inlet of the nozzle of the ejector (6).

According to this aspect, the refrigerant at the inlet of the first evaporator is held at a low dryness degree and the first evaporator is efficiently utilized to improve the refrigeration ability. Further, by keeping the refrigerant at the inlet of the ejector nozzle at a high dryness degree, the ejector nozzle diameter can be increased to reduce the cost of the ejector unit.

According to fourth and fifth aspects of the invention, there is provided an ejector-type cycle in any one of the first to third aspects, wherein the dryness degree adjusting mechanism (4) is of centrifugal or gravity type.

In this aspect, the dryness degree adjusting mechanism used in the ejector-type cycle according to the present invention is realized.

According to a sixth aspect of the invention, there is provided an ejector-type cycle in any one of the first to fifth aspects, which is applicable to a vehicle.

In this aspect, the applications of the ejector-type cycle according to the invention are further realized.

The present invention may be more fully understood from the description of the preferred embodiments of the invention set forth below, together with the accompanying drawings.

DESCRIPTION OF THE PREFERRED EMBODIMENTS

Figure 1:
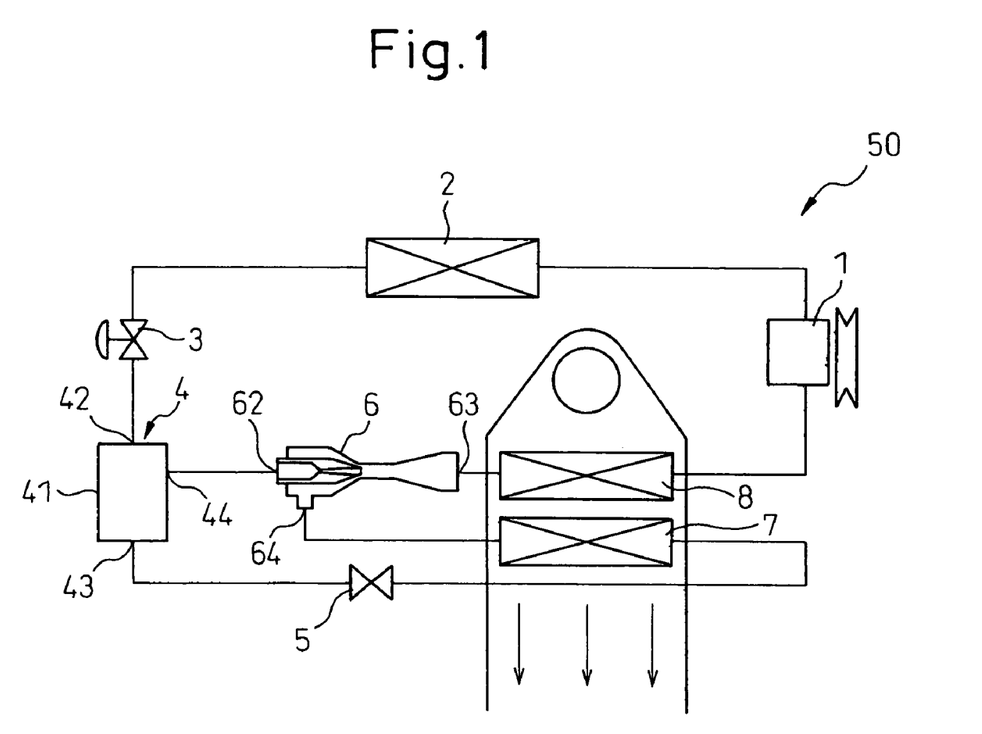
FIG. 1 is a diagram for explaining a first embodiment of the ejector-type cycle according to the present invention.

An embodiment of the ejector-type cycle according to the present invention is explained in detail below with reference to the drawings. FIG. 1 is a diagrammatic view for explaining a first embodiment of the ejector-type cycle according to the invention. In this embodiment of the invention, the ejector-type cycle is used with the climate control system of a vehicle. In FIG. 1, the component elements identical or similar to those of the conventional ejector-type cycle shown in FIG. 6 are designated by the same reference numerals, respectively.

The ejector-type cycle 50 according to the first embodiment of the invention shown in FIG. 1 comprises a compressor 1 for compressing the refrigerant, a condenser 2 for condensing a high-temperature, high-pressure gas refrigerant, a first orifice mechanism 3 for decompressing the high-temperature, high-pressure refrigerant at the outlet of the condenser 2, a dryness degree adjusting mechanism 4 for separating the refrigerant decompressed by the first orifice mechanism 3 into a liquid and a gas and adjusting the dryness thereof, a second orifice mechanism 5 for decompressing the saturated liquid refrigerant led from the dryness degree adjusting mechanism 4, a first evaporator 7 for evaporating the gas-liquid two-phase refrigerant decompressed by the second orifice mechanism 5 thereby to exchange heat with the air-conditioning air (external fluid), an ejector 6 for decompressing the gas-liquid two-phase refrigerant from the dryness degree adjusting mechanism 4 and sucking in the refrigerant evaporated in the first evaporator 7, and a second evaporator 8 for evaporating the gas-liquid two-phase refrigerant supplied from the ejector 6 and exchanging heat with the air-conditioning air (external fluid). These components are connected by piping as shown in FIG. 1.

The operation of the ejector-type cycle according to this embodiment and used for the cooling process in the vehicle climate control system (air conditioner) is explained below.

Figure 3:
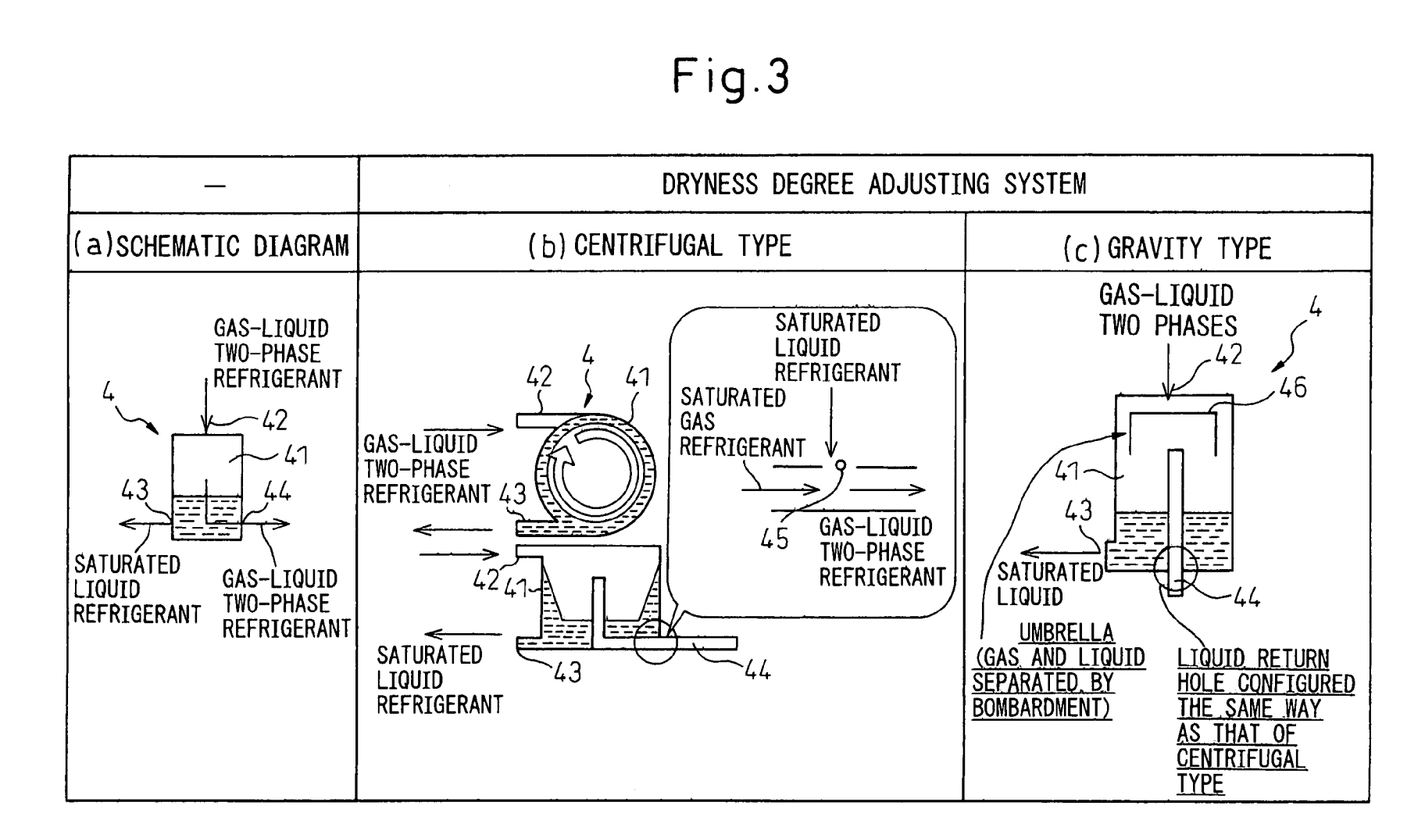
FIG. 3 shows various types of dryness degree adjusting mechanism, in which (a) is a schematic diagram, (b) shows a centrifugal type, and (c) shows a gravity type.

The refrigerant compressed by the compressor 1 is increased in temperature and pressure, cooled and condensed by the external air (or the external fluid) in the condenser 2, and after being expanded in the first orifice mechanism 3, is partly converted into a liquid and flows into the dryness degree adjusting mechanism 4. In the dryness degree adjusting mechanism 4, the gas-liquid two-phase refrigerant is separated into a gas and a liquid. The dryness degree adjusting mechanism 4 is shown in FIG. 3, and as illustrated in the schematic diagram of FIG. 3(a), includes a body 41, a refrigerant inlet 42, a saturated liquid refrigerant outlet 43 and a gas-liquid two-phase refrigerant outlet 44. The gas-liquid two-phase refrigerant flows in by way of the refrigerant inlet 42 and is separated into two phases of a gas and a liquid. Generally, however, the liquid refrigerant stays in the lower part of the body 41, while the gas refrigerant is collected in the upper part of the body 41. The refrigerant (or nozzle) inlet 62 of the ejector 6 is connected to the gas-liquid two-phase refrigerant outlet 44 of the dryness degree adjusting mechanism 4, while the saturated liquid refrigerant outlet 43 is connected to the refrigerant inlet of the first evaporator 7.

The refrigerant flowing into the ejector 6 is mixed with a liquid refrigerant into a gas-liquid two-phase form in the dryness degree adjusting mechanism 4 as described later. As the result of the refrigerant flowing at high speed through the nozzle of the ejector 6, the ejector 6 exhibits a sucking force (ability) and sucks in the refrigerant from the inlet (suction port) 64 through the first evaporator 7. The refrigerant outlet 63 of the ejector 6 is connected to the refrigerant inlet of the second evaporator 8, into which the gas-liquid two-phase refrigerant, high in dryness degree, flows. According to this embodiment, the first and second evaporators 7, 8, which are both arranged in the duct of the climate control system, exchange heat with the air-conditioning air (external fluid) and, thus, cool the air-conditioning air. In the second evaporator 8, the refrigerant is heated and evaporated by the air-conditioning air (external fluid) thereby to cool the air-conditioning air. The refrigerant passing through the second evaporator 8 is returned to the compressor 1.

As described above, the liquid refrigerant that has flowed out of the saturated liquid refrigerant outlet 43 of the dryness degree adjusting mechanism 4 is expanded in the second orifice mechanism 5 into a gas-liquid two-phase form (generally, low in dryness degree) and supplied to the first evaporator 7, in which it is heated and evaporated by the air-conditioning air (external fluid) so that the air-conditioning air is cooled by the heat of evaporation. The refrigerant passing through the first evaporator 7 flows into the ejector 6 from the inlet 64 by the sucking force of the ejector 6, and is mixed with the refrigerant flowing in from the refrigerant inlet 62, is discharged from the refrigerant outlet 63.

In the duct of the climate control system, as shown in FIG. 1, the second evaporator 8 is desirably arranged upstream of the first evaporator 7 from the viewpoint of heat utilization efficiency. Nevertheless, the second evaporator 8 may alternatively be arranged downstream of or in juxtaposition with the first evaporator 7.

As can be understood from comparison between FIGS. 1 and 6, the conventional ejector-type cycle and the ejector-type cycle according to this embodiment have the gas-liquid separators (or the dryness degree adjusting mechanisms) arranged at different positions.

Figure 2A:
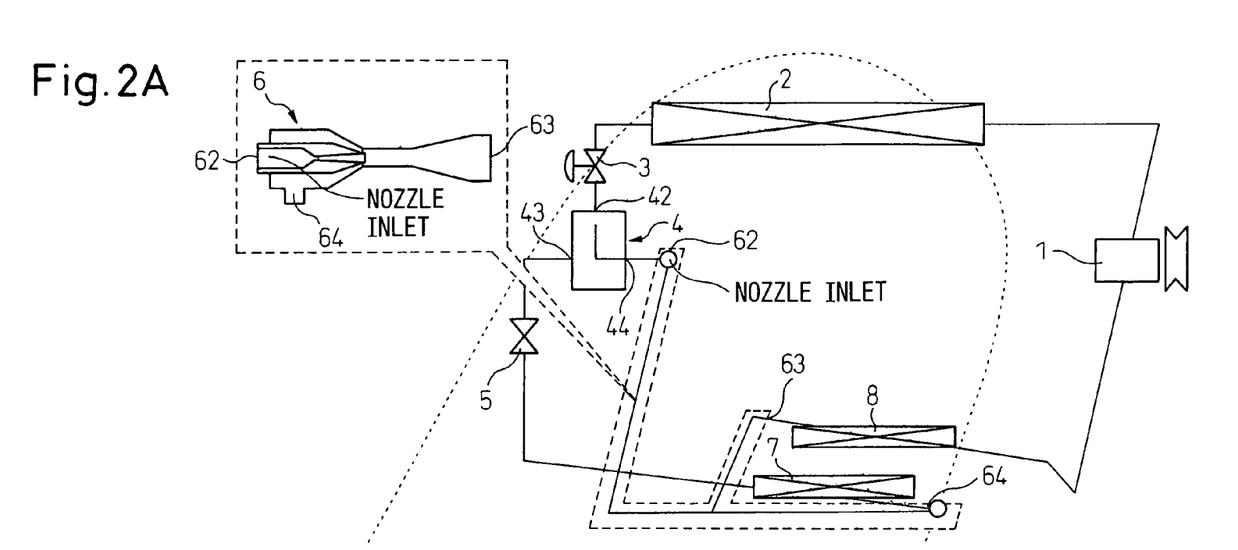
FIG. 2A is a diagram for explaining the ejector-type cycle according to the first embodiment with reference to corresponding Mollier charts.
Figure 2B:
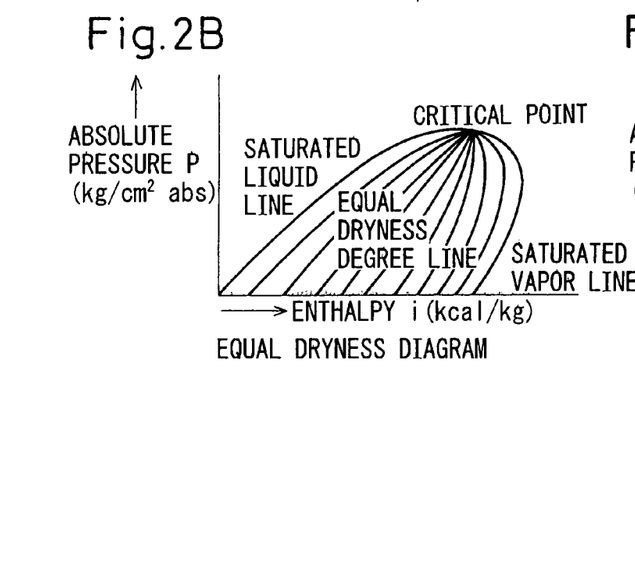
FIG. 2B is a Mollier chart showing equal-dryness degree lines.
Figure 2C:
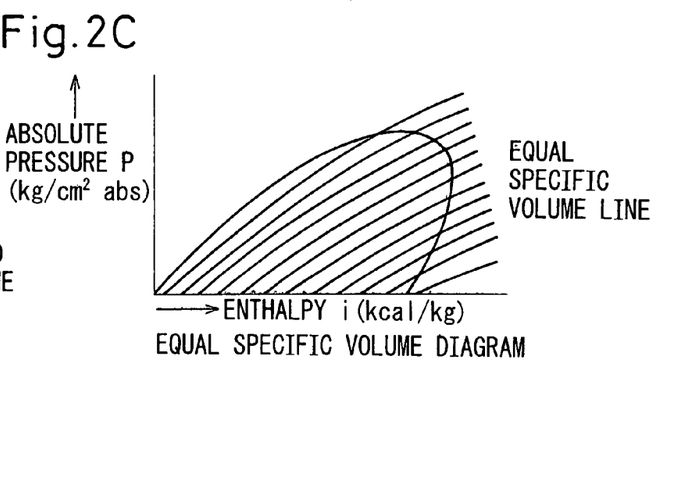
FIG. 2C is a Mollier chart showing equal-specific volume lines.

FIG. 2A is a diagram for explaining the ejector-type cycle according to the first embodiment with a corresponding Mollier chart. FIG. 2B shows the Mollier chart with equal-dryness degree lines. In FIG. 2B, the left side beyond the saturated liquid line assumes a liquid state, and the right side beyond the saturated vapor line assumes a gas state. FIG. 2C is a Mollier chart similar to FIG. 2B and shows an equal-specific volume line. In FIG. 2C, the volume increases progressively rightward. This diagram (FIG. 2C) shows that according to this embodiment, an operation with a large specific volume of the refrigerant flowing in the ejector 6 allows an increase in the nozzle diameter of the ejector 6. It can be understood from FIG. 2A that the first evaporator 7 can assume a wide enthalpy value from the neighborhood of the second orifice mechanism 5 to the neighborhood of the second evaporator 8 along the abscissa, i.e. that the dryness degree can be adjusted over a wide range. In the prior art shown in FIG. 6, in contrast, the first evaporator 7 is located downstream of the second evaporator 8, and therefore the dryness degree can be adjusted only up to the neighborhood of the second evaporator.

FIG. 3 indicates that various types of the dryness degree adjusting mechanism 4 can be used. FIG. 3(a) is a schematic diagram, and FIGS. 3(b) and (c) show the centrifugal type and the gravity type, respectively. In the centrifugal type of the dryness degree adjusting mechanism 4 shown in FIG. 3(b), the lower part is a side view and the upper part is a plan view of the cross section. The refrigerant flows in from the first diaphragm mechanism 3 through the refrigerant inlet 42. As shown in FIG. 3(b), the refrigerant inlet 42 is preferably arranged in such a manner that the refrigerant flows in from the tangential direction of the cylindrical body 41 on the outer periphery at the upper part of the cylindrical body 41. As a result, the inflowing refrigerant flows along the wall of the cylindrical body 41 and is subjected to the centrifugal force. This centrifugal force causes the liquid refrigerant high in specific gravity to be collected on the outside and the gas refrigerant to be collected at the central portion. The liquid refrigerant is heavy and therefore is collected and accumulated in the lower part of the body 41. Thus, the saturated liquid refrigerant outlet 43 is preferably formed to direct the tangential direction of the cylindrical body on the outer periphery of the lower part of the body. According to the first embodiment, the saturated gas refrigerant (or the gas-liquid two-phase refrigerant) outlet 44 connected to the second evaporator 8, as shown in FIG. 3(b), is arranged at the upper central portion in the body 41 with the upstream forward end thereof up. Therefore, most of the influent refrigerant substantially assumes the form of a gas. The pipe connected to the saturated gas refrigerant outlet 44 is preferably arranged in such a manner as to pass through the lower part of the body 41. This arrangement makes it possible to form a liquid return hole 45 on the pipe of the outlet 44 in the neighborhood of the lower part of the body. The liquid refrigerant enters the pipe connected to the saturated gas refrigerant outlet 44 from this liquid return hole 45. The refrigerant flowing out of the saturated gas refrigerant outlet 44, therefore, assumes two phases and is supplied to the second evaporator 8, so that only the liquid refrigerant therein can be evaporated. The body 41 may have another shape such as a cone.

FIG. 3(c) is a side view illustrating a dryness degree adjusting mechanism 4 of a gravity type. This type preferably has a refrigerant inlet 42 at the top thereof. As shown in FIG. 3(c), an umbrella or a cap-shaped umbrella 46 is preferably arranged immediately under the refrigerant inlet 42 in opposed relation thereto in the body 41, so that the influent gas-liquid two-phase refrigerant impinges on the umbrella 46 thereby to separate the refrigerant into gas and liquid phases. The liquid refrigerant is attached to the umbrella 46 and after dropping, is accumulated in the lower part of the body 41. The saturated liquid refrigerant outlet 43 is formed in the lower part of the body 41, and the upstream end of the saturated gas refrigerant (or the gas-liquid two-phase refrigerant) outlet 44 is preferably arranged upward under the umbrella 46 at the upper central portion of the body. The liquid return hole 45, like in the mechanism of the centrifugal type described above, is preferably formed on the pipe connected to the saturated gas refrigerant outlet 44 in the neighborhood of the lower part of the body, so that the liquid refrigerant is mixed with the gas refrigerant flowing out of the saturated gas refrigerant outlet 44. The body 41 may be cylindrical, rectangular, parallelopipedal or in any other shape having a polygonal cross section.

Figure 4:
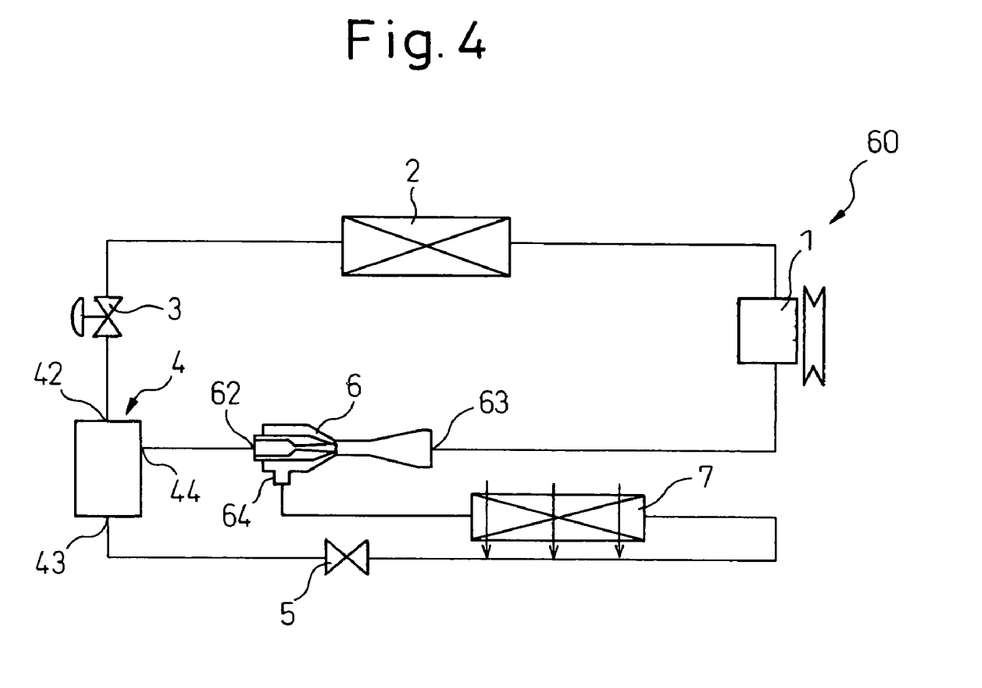
FIG. 4 is a schematic diagram for explaining a second embodiment of the ejector-type cycle according to the invention.
Figure 5:
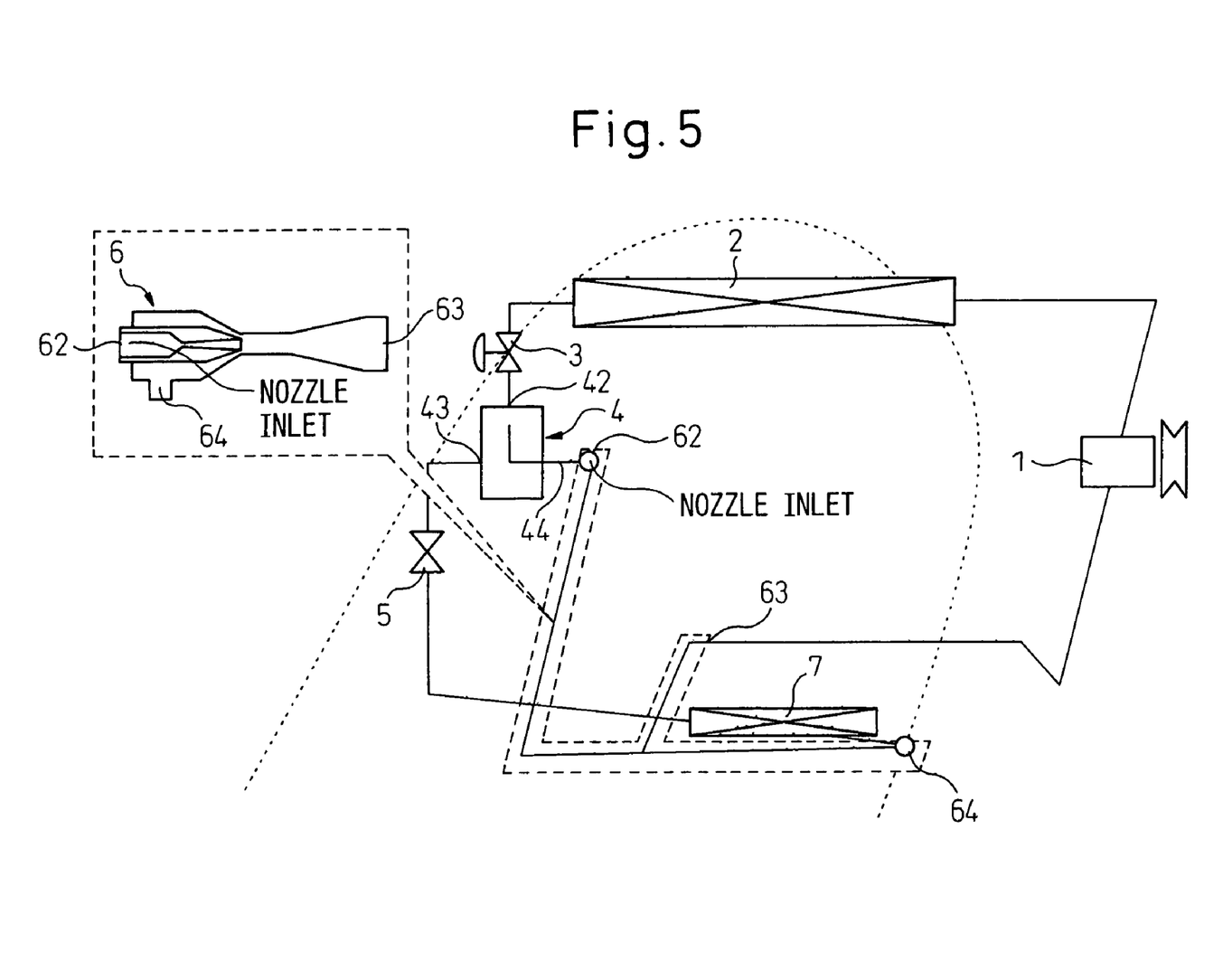
FIG. 5, like FIG. 2A, is a diagram for explaining an ejector-type cycle with reference to a corresponding to Mollier chart according to the second embodiment of the invention.

FIG. 4 is a diagram for explaining the ejector-type cycle according to a second embodiment of the invention. FIG. 5, like FIG. 2A, is a diagram for explaining the ejector-type cycle according to the second embodiment with a corresponding Mollier chart. In FIGS. 4 and 5, the components identical or similar to those of the ejector-type cycle according to the first embodiment shown in FIG. 1 are designated by the same reference numerals, respectively. The ejector-type cycle 60 according to this embodiment does not comprise the second evaporator 8 included in the first embodiment. The refrigerant flowing out of the ejector 6, therefore, is introduced directly into the pipe connected to the intake side of the compressor 1.

The refrigerant inlet and the refrigerant outlet of the first evaporator 7 are connected to the second orifice mechanism 5 and the inlet (suction port) 64 of the ejector 6, respectively, as in the configuration according to the first embodiment. Also, as in the first embodiment, it can be easily understood, from FIG. 5, that the dryness degree of the refrigerant introduced into the first evaporator can be adjusted over a wide range. The remaining components of the configuration according to this embodiment are similar to the corresponding components of the first embodiment, and, therefore, are not explained any further. Also in this embodiment, the dryness degree adjusting mechanism 4 may be of either centrifugal or gravity type.

Next, the effects and functions of the embodiments described above are explained.

The ejector-type cycle according to the first embodiment of the present invention is expected to produce the effects and the functions described below.

The ejector-type cycle according to this invention in which the upstream side thereof is split into branches is characterized in that the gas-liquid two-phase refrigerant decompressed by the first orifice mechanism 3 is separated into gas and liquid phases by the dryness degree adjusting mechanism 4 and after thus adjusting the dryness degree, the saturated liquid refrigerant is introduced to the second orifice mechanism 5 so that a refrigerant having a predetermined high dryness degree is led to the inlet of the ejector nozzle.

This feature makes it possible to adjust the dryness degree of the refrigerant at the inlet of the first evaporator 7 and the inlet of the ejector nozzle.

As a result, the refrigerant at the inlet of the first evaporator can be kept at a low dryness degree and the first evaporator 7 can be efficiently utilized for an improved refrigeration ability of the ejector-type cycle.

Further, in view of the fact that the refrigerant at the inlet of the ejector nozzle can be kept at a high dryness degree (a large specific volume of the refrigerant can be secured) (FIG. 2C), the diameter of the ejector nozzle can be increased (the refrigerant can flow at high speed even in a large diameter), and the ejector nozzle can be easily fabricated, thereby making it possible to reduce the cost of each ejector and hence the ejector-type cycle.

The ejector-type cycle according to the second embodiment of the present invention is expected to produce substantially the same effects and functions as the first embodiment.

Other Embodiments

In the aforementioned embodiments the ejector-type cycle according to this invention is described above as an application to cool the air-conditioning air in a climate control system. As an alternative, the ejector-type cycle may be used as a system for air-conditioning and cold storage or refrigeration, in which case one of the two evaporators (normally, the second evaporator 8) may be used for air conditioning, and the other evaporator (normally, the first evaporator 7) may be used for cold storage (refrigeration) or for other applications as a cooling in an air-conditioning or refrigeration unit.

Also, the ejector-type cycle according to the present invention is not limited to the embodiments described above, but is applicable not only as a cooling cycle in which the heat exchanger (first evaporator 7 in the first embodiment) decompressed by the ejector constitutes an indoor heat exchanger using cooling energy of the cooling cycle, but also as a heating cycle (such as a heat exchanger for the heat source of the heating operation in air-conditioning) with the outdoor heat exchanger constituting a heat source supplying heat energy or as a heat pump cycle reversibly operable as a cooling or heating cycle.

In the embodiments described above or shown in the accompanying drawings, the dryness degree adjusting mechanism is not limited to a centrifugal or gravity type but may include any gas-liquid separating structure known to those skilled in the art. Further, the refrigerant inlet 41, the saturated liquid refrigerant outlet 43, the saturated gas refrigerant outlet 44 and the liquid return hole 45 may be located at any positions other than those described in the above embodiment as long as the functions required of the dryness degree adjusting mechanism such as the gas-liquid separation function can be exhibited.

Although, in the embodiments, the invention is explained above as an application to an automotive climate control system, the invention can find also an application as a refrigerated carrier, a refrigerated container or the like refrigeration unit. Further, the applications of this invention are not limited to vehicles and climate control systems.

Apart from this, only the required minimum components of this invention are described or explained with the foregoing embodiments and drawings showing the embodiments. Nevertheless, other components than in the embodiments described may be additionally used in accordance with the required functions or operations.

The embodiments described above are examples of the invention, and this invention is not limited to these embodiments but is defined only by the description in the appended claims and can be embodied to form other than those described above.

While the invention has been described by reference to specific embodiments chosen for the purposes of illustration, it should be apparent that numerous modifications could be made thereto by those skilled in the art without departing from the basic concept and scope of the invention.

The invention claimed is:

1. An ejector-type cycle for exchanging heat using a refrigerant, comprising:
    a compressor for compressing the refrigerant;
    a condenser for condensing the refrigerant compressed by the compressor;
    a first orifice arranged downstream of the condenser to expand the refrigerant;
    an ejector arranged downstream of the first orifice and capable of exhibiting a sucking ability at an inlet thereof with the refrigerant passing through a nozzle of the ejector;
    an evaporator for exchanging heat with an external fluid by passing the refrigerant through the evaporator and having a refrigerant outlet connected to the inlet of the ejector;
    a dryness degree adjusting mechanism interposed between the first orifice and the ejector and connected to the ejector and the evaporator so as to supply the refrigerant thereto; and
    a second orifice arranged downstream of and connected to the dryness degree adjusting mechanism and arranged upstream of and connected to the evaporator; wherein
    the dryness degree adjusting mechanism is located downstream of the first orifice and divides a refrigerant inflow into a first refrigerant outflow and a second refrigerant outflow;
    the first refrigerant outflow is supplied to the nozzle of the ejector; and
    the second refrigerant outflow is supplied to the second orifice.

2. An ejector-type cycle according to claim 1, further comprising a second evaporator connected to the ejector and supplied with the refrigerant from the ejector, the second evaporator being adapted to exchange heat with an external fluid.

3. An ejector-type cycle according to claim 1, wherein the dryness degree adjusting mechanism is of centrifugal type.

4. An ejector-type cycle according to claim 1, wherein the dryness degree adjusting mechanism is of gravity type.

5. An ejector-type cycle according to claim 1, being applicable to a vehicle.

6. An ejector-type cycle for exchanging heat using a refrigerant, comprising:
    a compressor for compressing the refrigerant;
    a condenser for condensing the refrigerant compressed by the compressor;
    a first orifice arranged downstream of the condenser to expand the refrigerant;
    an ejector arranged downstream of the first orifice and capable of exhibiting a sucking ability at an inlet thereof with the refrigerant passing through a nozzle of the ejector;
    an evaporator for exchanging heat with an external fluid by passing the refrigerant through the evaporator and having a refrigerant outlet connected to the inlet of the ejector;
    a dryness degree adjusting mechanism interposed between the first orifice and the ejector and connected to the ejector and the evaporator so as to supply the refrigerant thereto; and a second orifice arranged downstream of and connected to the dryness degree adjusting mechanism and arranged upstream of and connected to the evaporator; wherein the dryness degree adjusting mechanism separates the gas-liquid two-phase refrigerant decompressed by the first orifice into gas and liquid phases and adjusts the dryness degree of the refrigerant, after which a liquid refrigerant is introduced to the second orifice so that a refrigerant of a predetermined high dryness degree is introduced to an inlet of the nozzle of the ejector.

* * * * *